United States Patent
Kono et al.

(10) Patent No.: US 7,047,742 B2
(45) Date of Patent: May 23, 2006

(54) TURBOCHARGED ENGINE AND METHOD FOR PREVENTING SURGING IN COMPRESSOR

(75) Inventors: Kazutoshi Kono, Fujisawa (JP); Kenji Hatano, Fujisawa (JP); Shinichiro Kawai, Fujisawa (JP); Hideki Osada, Fujusawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/854,530

(22) Filed: May 26, 2004

(65) Prior Publication Data

US 2004/0244375 A1   Dec. 9, 2004

(30) Foreign Application Priority Data

Jun. 3, 2003   (JP)   ............... 2003-158299

(51) Int. Cl.
*F02B 33/44*   (2006.01)
*F02B 37/12*   (2006.01)
*F02M 25/07*   (2006.01)

(52) U.S. Cl. ............... 60/605.2; 60/605.1; 123/568.12
(58) Field of Classification Search ............... 60/605.2, 60/605.1, 600–603; 123/568.12; F02B 37/12
See application file for complete search history.

(56) References Cited

U.S. PATENT DOCUMENTS

| | | | | |
|---|---|---|---|---|
| 5,724,813 A | 3/1998 | Fenelon et al. | ............... | 60/606 |
| 6,381,961 B1 * | 5/2002 | Bischoff | ............... | 60/605.2 |
| 6,470,864 B1 * | 10/2002 | Kim et al. | ............... | 60/605.2 |
| 6,675,579 B1 * | 1/2004 | Yang | ............... | 60/605.2 |
| 6,715,287 B1 * | 4/2004 | Engel et al. | ............... | 60/601 |
| 6,725,660 B1 * | 4/2004 | Hidaka | ............... | 60/602 |
| 6,868,840 B1 * | 3/2005 | Lewallen | ............... | 60/605.2 |
| 2001/0035171 A1 | 11/2001 | Kim et al. | ............... | 123/568.12 |

FOREIGN PATENT DOCUMENTS

| | | |
|---|---|---|
| DE | 32 25 867 A1 | 1/1984 |
| DE | 3244928 A1 * | 6/1984 |
| JP | 59-138749 | 8/1984 |
| JP | 60-45730 | 3/1985 |
| JP | 06-288269 | 10/1994 |
| JP | 2001-165000 | 6/2001 |

OTHER PUBLICATIONS

Copy of European Search Report for Serial No. EP 04 01 2795 dated Jul. 22, 2005.

* cited by examiner

*Primary Examiner*—Thai-Ba Trieu
(74) *Attorney, Agent, or Firm*—McCormick, Paulding & Huber LLP

(57) ABSTRACT

The turbocharged engine in accordance with the present invention comprises an EGR unit having an EGR passage linking an intake passage and an exhaust passage and an EGR valve provided in the EGR passage. The engine further comprises deceleration deciding unit for deciding as to whether a vehicle decelerates, and intake air release unit for opening the EGR valve and causing part of the intake air present in the intake passage to flow into the exhaust passage through the EGR passage when the deceleration deciding unit decides that the vehicle is decelerating.

6 Claims, 3 Drawing Sheets

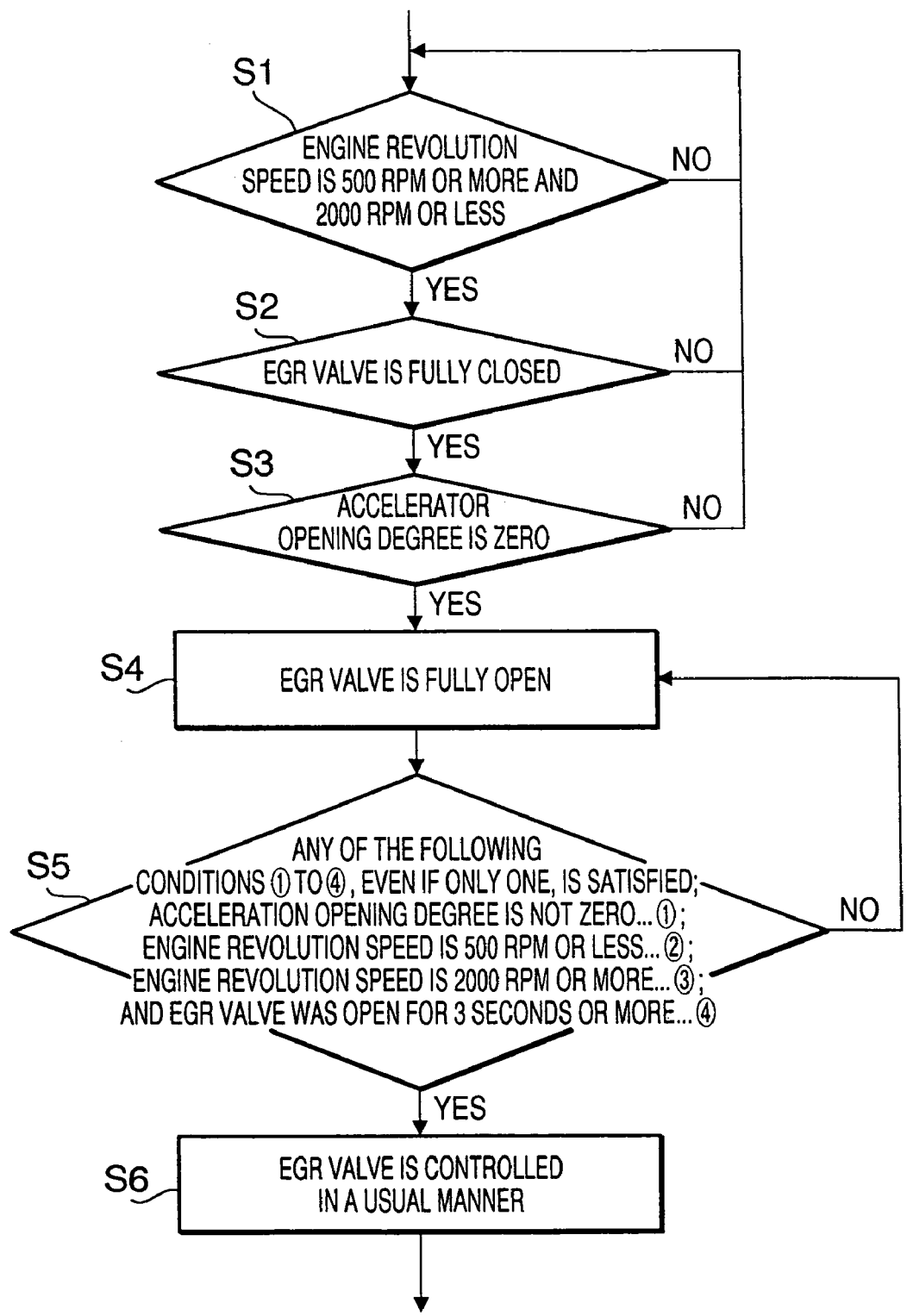

TURBOCHARGED ENGINE AND METHOD FOR PREVENTING SURGING IN COMPRESSOR

CROSS REFERENCE TO RELATED APPLICATION

Applicants hereby claim foreign priority benefits under U.S.C. § 119 of Japanese Patent Application No. 2003-158299, filed on Jun. 3, 2003, and the content of which is herein incorporated by reference.

BACKGROUND OF THE INVENTION

1. Field of the Invention

The present invention relates to a turbocharged engine comprising an EGR unit having an EGR passage linking an intake passage and an exhaust passage and an EGR valve provided in the EGR passage.

2. Description of the Related Art

An EGR unit (Exhaust Gas Recirculation unit) is generally known as a device for reducing the amount of NOx (nitrogen oxides) in exhaust gas. The EGR unit comprises an EGR passage linking an intake passage and an exhaust passage and an EGR valve provided in the EGR passage.

The EGR unit opens the EGR valve, causes part of the exhaust gas present inside the exhaust passage to flow into the intake passage via the EGR passage, mixes this exhaust gas with the intake air, and guides the mixture into the combustion chamber, thereby reducing the concentration of oxygen in the intake air, lowering the combustion temperature, and decreasing the amount of discharged NOx.

Such an EGR unit is used in the turbocharged engine as well (see, for example, Japanese Patent Application Laid-open No. 2001-165000).

Usually in such an EGR unit, when a vehicle is decelerating, because the accelerator is off and fuel injection is not conducted, the EGR valve is fully closed.

However, in a turbocharged engine, when a vehicle is decelerating, a burst pressure sometimes remains inside the intake passage and the intake pressure sometimes crosses the surge line of the turbocharger compressor. If the surge line is crossed, surging is induced in the compressor, creating a risk of damage caused by vibrations or heat.

SUMMARY OF THE INVENTION

The present invention was created with the aforementioned problems in view and it is an object of the present invention to prevent surging in the compressor occurring when a vehicle is decelerating.

In accordance with the first aspect of the present invention, there is provided a turbocharged engine comprising an EGR unit having an EGR passage linking an intake passage and an exhaust passage and an EGR valve provided in the EGR passage, the engine further comprising deceleration deciding means for deciding as to whether a vehicle decelerates and intake air release means for opening the EGR valve and causing part of the intake air present in the intake passage to flow into the exhaust passage through the EGR passage when the deceleration deciding means decides that the vehicle is decelerating.

With this configuration, surging in the compressor occurring when the vehicle is decelerating can be prevented by reducing the intake pressure inside the intake passage when the vehicle is decelerating.

The turbocharged engine may comprise engine revolution speed detection means for detecting the engine revolution speed and accelerator opening degree detection means for detecting the accelerator opening degree, wherein the deceleration deciding means may decide that the vehicle has decelerated when the engine revolution speed detected by the engine revolution speed detection means is within a prescribed range and the accelerator opening degree detected by the accelerator opening degree detection means is zero.

It is preferred that the predetermined range be 500 rpm or higher to 2000 rpm or less.

It is preferred that the engine revolution speed detection means be an engine revolution speed sensor.

It is preferred that the accelerator opening degree detection means be an accelerator opening degree sensor.

Here, the intake air release means may close the EGR valve once a prescribed time elapses after the EGR valve was opened.

It is preferred that the prescribed time be 3 seconds.

In accordance with the second aspect of the present invention, there is provided a method for preventing surging in a compressor of a turbocharged engine comprising an EGR unit having an EGR passage linking an intake passage and an exhaust passage and an EGR valve provided in the EGR passage, wherein the intake pressure in the intake passage is reduced by opening the EGR valve and causing part of the intake air present in the intake passage to flow into the exhaust passage via the EGR passage when a decision is made that the vehicle is decelerating.

BRIEF DESCRIPTION OF THE DRAWINGS

FIG. 3 is a flow chart of a control method of the present embodiment executed with the ECU.

DESCRIPTION OF THE PREFERRED EMBODIMENTS

The preferred embodiments of the present invention will be described below with reference to the appended drawings.

Figure 1:
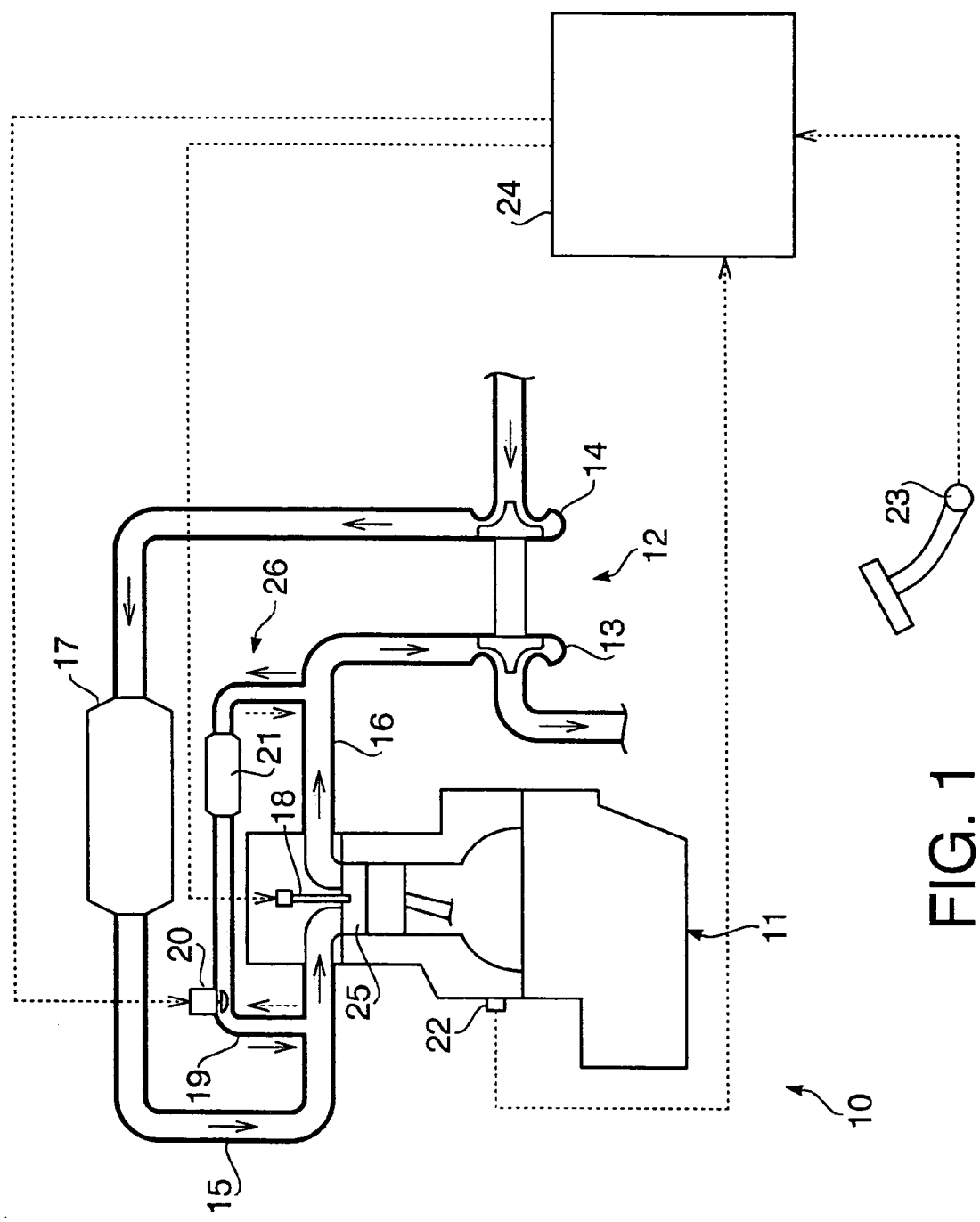
FIG. 1 is a schematic view of a turbocharged diesel engine illustrating the preferred embodiment of the present invention.

A turbocharged diesel engine of the present embodiment is shown in FIG. 1. A turbocharged diesel engine 10 comprises an engine body 11, a turbocharger 12, an intake passage 15, an exhaust passage 16, and an EGR unit 26.

The engine body 11 comprises a combustion chamber 25. Further, the engine body 11 also comprises a fuel injector 18 for injecting fuel into the combustion chamber 25 and an engine revolution speed sensor 22 serving as engine revolution speed detection means for detecting the engine revolution speed. The turbocharger 12 comprises a turbine 13 and a compressor 14, and the turbine 13 and compressor 14 are linked together by a rotary shaft.

The intake passage 15 is connected at the upstream side thereof to the compressor 14 and at the downstream side thereof to the combustion chamber 25. Furthermore, the intake passage 15 comprises an intercooler 17 for cooling the intake air between the compressor 14 and combustion chamber 25. The exhaust passage 16 is connected at the upstream side thereof to the combustion chamber 25 and at the downstream side thereof to the turbine 13.

The EGR unit 26 comprises an EGR passage 19 linking the intake passage 15 and the exhaust passage 16, an EGR valve 20 that can open and close the EGR passage 19, and an EGR cooler 21 for cooling the exhaust gas. The EGR passage 19 is connected at one end thereof to the intake passage 15 downstream of the intercooler 17 and at the other end thereof to the exhaust passage 16 upstream of the turbine 13.

Furthermore, the turbocharged diesel engine 10 also comprises an ECU (Engine Control Unit) 24 and an accelerator opening sensor 23 serving as accelerator opening degree detection means for detecting the accelerator opening degree.

The ECU 24 is connected to the engine revolution speed sensor 22 and accelerator opening degree sensor 23 and signals are transmitted from those sensors. Furthermore, the ECU 24 is connected to the fuel injector 18 and the EGR valve 20 and controls those valves.

The intake air is compressed by the compressor 14 and reaches the intercooler 17 via the intake passage 15. The intake air is cooled in the intercooler 17 and then reaches the combustion chamber 25 through the downstream intake passage 25. In the combustion chamber 25, the intake air is mixed with the fuel injected by the fuel injector 18, combusted and discharged as an exhaust gas.

The exhaust gas reaches the turbine 13 via the exhaust passage 16. The exhaust gas drives the turbine 13 and is then discharged via an aftertreatment unit or the like (not shown in the figure).

Part of the exhaust gas located in the exhaust passage 16 flows into the EGR passage 19 and reaches the EGR cooler 21. The exhaust gas is cooled in the EGR cooler 21 and returned to the intake passage 15. The flow of the exhaust gas in this process in shown by a solid line. The exhaust gas is mixed with the intake air in the intake passage 15 and the mixture flows into the combustion chamber 25.

The ECU 24 open-close controls the EGR valve 20 and adjusts the EGR ratio based on the operation state (engine revolution speed, accelerator opening degree, and the like) of the engine body 11.

Further, in accordance with the present invention, in such a turbocharged diesel engine 10, surging of the compressor 14 during vehicle deceleration is prevented. More specifically, the present invention comprises the after-mentioned deceleration decision means and intake air release means. The deceleration decision means decides that the vehicle is decelerating. The intake air release means opens the EGR valve 20 when the deceleration decision means decides that the vehicle is decelerating, and causes part of the intake air present in the intake passage 15 to flow into the exhaust passage 16 via the EGR passage 19, thereby reducing the intake pressure inside the intake passage 15.

In the present embodiment, the deceleration decision means is comprising the ECU 24, engine revolution speed sensor 22, and accelerator opening degree sensor 23. A decision is made that the vehicle has decelerated when the engine revolution speed is within the predetermined range and the acceleration opening degree is zero.

The intake air release means is comprising the ECU 24. When the deceleration decision means makes a decision that the vehicle is decelerating, this means completely opens the EGR valve 20.

A control method executed by the ECU 24 of the present embodiment will be explained hereinbelow by using the flowchart shown in FIG. 3.

First, in step 1, the ECU 24 decides as to whether the engine revolution speed is 500 rpm or more and 2000 rpm or less. When the engine revolution speed is 500 rpm or less, the engine is considered to be in an idling mode and the vehicle is considered to be stopped. Therefore, the decision that the vehicle has decelerated is not made.

Then, in step 2, the ECU 24 decides as to whether the EGR valve 20 has been completely opened and then in step 3 decides as to whether the acceleration opening degree is zero.

When in each step of the steps 1 to 3 the ECU 24 decides that the conditions of each step are satisfied, it moves to the next step, but when the conditions of each step are not satisfied, the processing flow returns to step 1 and the decision process is repeated.

On the other hand, when all the conditions of steps 1 to 3 are satisfied, the ECU 24 completely opens the EGR valve 20 in step 4. In other words, the ECU 24 decides that the vehicle has decelerated when the engine revolution speed is within the predetermined range (500 rpm or more and 2000 rpm or less) and the acceleration opening degree is zero.

In step 5, the ECU 24 makes a decision relating to the following conditions ① to ④: the acceleration opening degree is not zero . . . ①; the engine revolution speed is 500 rpm or less . . . ②; the engine revolution speed is 2000 rpm or more . . . ③; and the EGR valve was open for 3 seconds or more . . . ④. If even one of those conditions is satisfied, the processing flow moves to step 6 and usual control of the EGR 20 is conducted based on the engine operation state.

The flows of intake air and exhaust gas at the time the vehicle has decelerated will be described below.

Referring to FIG. 1, when a decision is made that the vehicle is decelerating and the ECU 24 fully opens the EGR valve 20, part of the intake air present in the intake passage 15 flows through the EGR passage 19 into the exhaust passage 16, in contrast to the usual control state. The flow of the intake air at this time is shown by a broken line arrow. The intake air is mixed with the exhaust gas in the exhaust passage 16 and discharged. As a result, the intake pressure inside the intake passage 15 is reduced.

The effect produced by opening the EGR valve 20 when the vehicle is decelerating will be described below.

Figure 2:
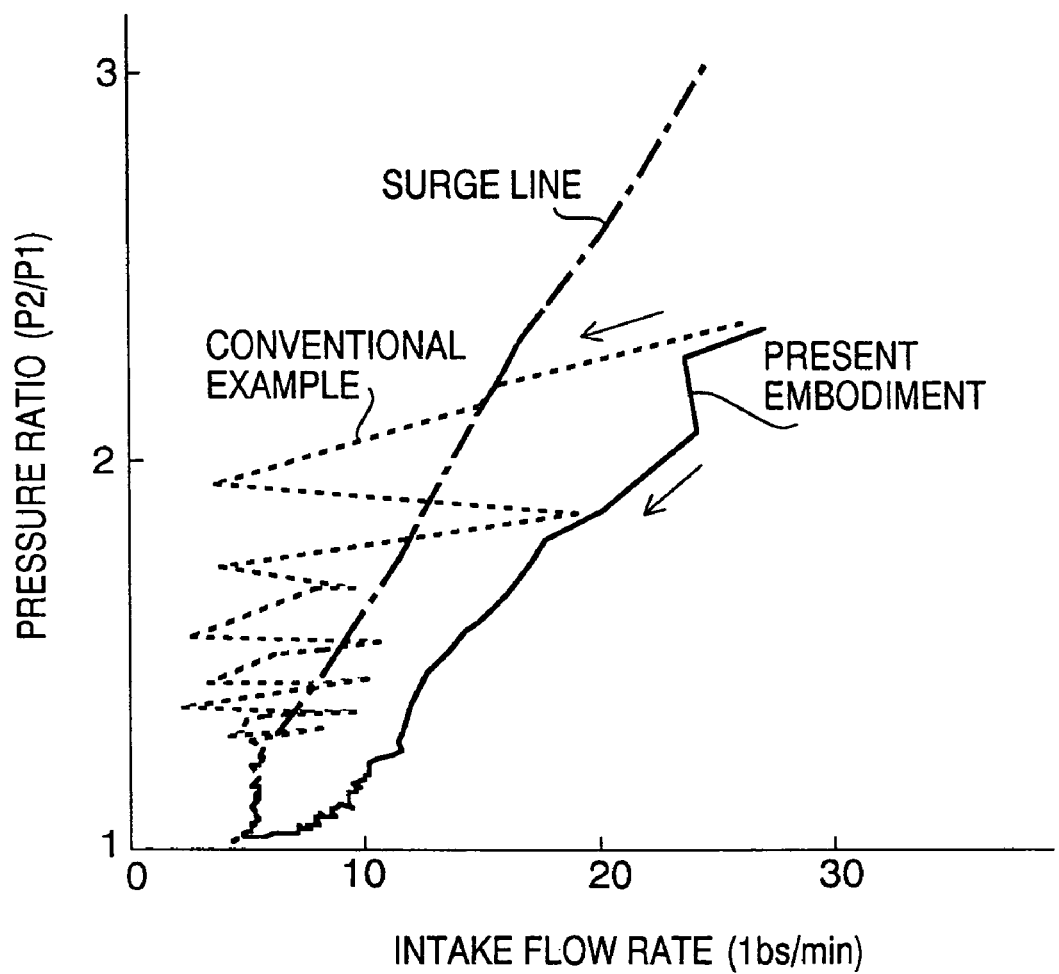
FIG. 2 is an intake air flow rate—pressure ratio diagram of a compressor.

FIG. 2 shows the relation between the inlet/outlet pressure ratio (P2/P1) and intake flow rate in the compressor 14. P1 is an intake pressure on the inlet side of the compressor 14, and P2 is an intake pressure on the outlet side of the compressor 14. The dash-dot line in the figure is a surge line and surging occurs on the left side from the surge line.

The broken line in the figure illustrates changes at the time of vehicle deceleration in a conventional example in which the EGR valve 20 is fully closed. In this case, because a boost pressure remains inside the intake passage 15, the intake pressure (intake pressure P2 on the outlet side of the compressor 14) is high and the intake flow rate crosses the surge line and decreases. The intake flow rate occasionally increases because the intake valve of the engine body 11 opens and the intake pressure inside the intake passage 15 decreases.

The solid line in the figure illustrates changes at the time of vehicle deceleration in the present embodiment in which the EGR valve 20 is fully open. As described hereinabove, when the vehicle is decelerating, part of the intake air present inside the intake passage flows into the exhaust passage 16 via the EGR passage 19. Therefore, the intake pressure (intake pressure P2 on the outlet side of the compressor 14) inside the intake pressure 15 decreases. As a result, the intake flow rate increases by comparison with the conventional example and does not cross the surge line and surging does not occur.

Thus, with the turbocharged diesel engine 10 of the present embodiment, surging of the compressor 14 can be prevented by decreasing the intake pressure inside the intake passage 15 when the vehicle is decelerating.

Further, usually because exhaust gas flows through the EGR passage 19, soot and the like adheres thereto. In the present embodiment, passing the intake air through the EGR passage 19 also produces an effect of sweeping and removing soot or the like present inside the EGR passage 19 into the exhaust passage 16.

Further, because the EGR unit 26 is used as means for releasing the intake pressure inside the intake passage, it is not necessary to install separately a passage or a valve for intake air release and a simple low-cost structure can be obtained.

Various other embodiments of the present invention can be considered and the present invention is not limited to the above-described embodiment.

For example, in the above-described embodiment, deceleration decision means may decide as to whether the vehicle has decelerated based on changes in the engine revolution speed.

Furthermore, in the turbocharged diesel engine 10 shown in FIG. 1, deceleration decision means may comprise a vehicle speed sensor for detecting the vehicle speed and may decide as to whether the vehicle has decelerated based on changes in the vehicle speed.

The turbocharged engine of the present embodiment demonstrates an excellent effect of preventing the compressor from surging when the vehicle is decelerating.

What is claimed is:

1. A turbocharged engine comprising an EGR unit having an EGR passage linking an intake passage and an exhaust passage and an EGR valve provided in said EGR passage, said engine further comprising:

deceleration deciding means for deciding as to whether a vehicle decelerates; and intake air release means for opening said EGR valve and releasing part of the intake air present in said intake passage into said exhaust passage through said EGR passage when said deceleration deciding means decides that the vehicle is decelerating;

wherein said intake air release means closes said EGR valve once a prescribed time elapses after said EGR valve was opened.

2. The turbocharged engine according to claim 1, comprising:

engine revolution speed detection means for detecting the engine revolution speed; and accelerator opening degree detection means for detecting the accelerator opening degree, wherein said deceleration deciding means decides that the vehicle has decelerated when the engine revolution speed detected by said engine revolution speed detection means is within a prescribed range and the accelerator opening degree detected by said accelerator opening degree detection means is zero.

3. The turbocharged engine according to claim 2, wherein said prescribed range is between about 500 rpm and about 2000 rpm.

4. The turbocharged engine according to claim 2, wherein said engine revolution speed detection means is an engine revolution speed sensor.

5. The turbocharged engine according to claim 2, wherein said accelerator opening degree detection means is an accelerator opening degree sensor.

6. The turbocharged engine according to claim 1, wherein said prescribed time is 3 seconds.

* * * * *